US008756906B2

(12) United States Patent
Hayashi

(10) Patent No.: US 8,756,906 B2
(45) Date of Patent: Jun. 24, 2014

(54) COATED OPTICAL FIBER PRODUCING APPARATUS AND COATED OPTICAL FIBER PRODUCING METHOD

(75) Inventor: Tetsuya Hayashi, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 808 days.

(21) Appl. No.: 12/996,310

(22) PCT Filed: Mar. 11, 2009

(86) PCT No.: PCT/JP2009/054687
§ 371 (c)(1),
(2), (4) Date: Dec. 3, 2010

(87) PCT Pub. No.: WO2009/147881
PCT Pub. Date: Dec. 10, 2009

(65) Prior Publication Data
US 2011/0081481 A1    Apr. 7, 2011

(30) Foreign Application Priority Data

Jun. 5, 2008 (JP) ................. P2008-148487

(51) Int. Cl.
*D01H 7/92* (2006.01)
(52) U.S. Cl.
USPC ............................................. 57/204; 57/293
(58) Field of Classification Search
USPC ....................... 57/204, 293; 65/402
See application file for complete search history.

(56) References Cited

U.S. PATENT DOCUMENTS

| 5,943,466 A | * | 8/1999 | Henderson et al. ........... 385/123 |
| 6,324,872 B1 | * | 12/2001 | Blaszyk et al. ................. 65/504 |
| 6,536,700 B2 | * | 3/2003 | Watson et al. ............. 242/419.7 |
| 6,550,283 B2 | * | 4/2003 | Blaszyk et al. ................ 65/402 |
| 7,317,855 B2 | | 1/2008 | Chen et al. |
| 8,245,541 B2 | * | 8/2012 | Habasaki et al. ............... 65/402 |
| 8,443,581 B2 | * | 5/2013 | Koshimizu et al. ............. 57/293 |
| 2002/0026813 A1 | * | 3/2002 | Blaszyk et al. ................ 65/402 |

(Continued)

FOREIGN PATENT DOCUMENTS

| EP | 1 481 951 A1 | 12/2004 |
| JP | 08-050208 | 2/1996 |

(Continued)

OTHER PUBLICATIONS

International Preliminary Report on Patentability and Written Opinion of the International Searching Authority issued in International Patent Application No. PCT/JP2009/054687, mailed Jan. 20, 2011.

(Continued)

Primary Examiner — Shaun R Hurley
(74) Attorney, Agent, or Firm — McDermott Will & Emery LLP

(57) ABSTRACT

An upstream twisting inhibiting roller, a twist non-inhibiting roller, a twist provider and a downstream twist inhibiting roller are provided in this order along the path line of a coated optical fiber. The twist provider provides the twist to the coated optical fiber. The upstream twist inhibiting roller and the downstream twist inhibiting roller respectively inhibit a rotation of the coated optical fiber around the axis of the coated optical fiber. The twist non-inhibiting roller does not inhibit the rotation of the coated optical fiber around the axis of the coated optical fiber.

14 Claims, 16 Drawing Sheets

(56) References Cited

U.S. PATENT DOCUMENTS

| | | |
|---|---|---|
| 2004/0003628 A1* | 1/2004 | Shimazu et al. ............... 65/402 |
| 2004/0184751 A1* | 9/2004 | Chen et al. .................. 385/123 |
| 2004/0232571 A1 | 11/2004 | Tong et al. |
| 2006/0133751 A1 | 6/2006 | Chen et al. |

FOREIGN PATENT DOCUMENTS

| | | |
|---|---|---|
| JP | 2001-147332 | 5/2001 |
| JP | 2003-327445 A1 | 11/2003 |
| JP | 2004-161572 | 6/2004 |
| WO | WO 2005/021453 A1 | 3/2005 |
| WO | WO 2006/107353 A2 | 10/2006 |

OTHER PUBLICATIONS

European Search Report issued in European Patent Application No. EP 09758148.2 dated Jul. 12, 2011.

* cited by examiner

*Fig.8*

| $L_p \backslash \gamma_w$ | 1 | 2 | 3 | 4 |
|---|---|---|---|---|
| 5 | 0.16 | 0.35 | 0.60 | 1.06 |
| 10 | 0.32 | 0.69 | 1.19 | 2.12 |
| 20 | 0.65 | 1.39 | 2.39 | 4.24 |
| 30 | 0.97 | 2.08 | 3.58 | 6.37 |
| 40 | 1.30 | 2.78 | 4.77 | 8.49 |
| 50 | 1.62 | 3.47 | 5.97 | 10.61 |
| 100 | 3.25 | 6.65 | 11.94 | 21.22 |

*Fig.9*

| $L_p \backslash \gamma_w$ | 1 | 2 | 3 | 4 |
|---|---|---|---|---|
| 5 | 0.08 | 0.16 | 0.25 | 0.35 |
| 10 | 0.16 | 0.32 | 0.50 | 0.69 |
| 20 | 0.32 | 0.65 | 1.00 | 1.39 |
| 30 | 0.48 | 0.97 | 1.50 | 2.08 |
| 40 | 0.64 | 1.30 | 2.00 | 2.78 |
| 50 | 0.80 | 1.62 | 2.50 | 3.47 |
| 100 | 1.60 | 3.25 | 5.01 | 6.95 |

Fig.10

| $L_p \backslash \gamma w$ | 1 | 2 | 3 | 4 |
|---|---|---|---|---|
| 5 | 0.04 | 0.08 | 0.12 | 0.16 |
| 10 | 0.08 | 0.16 | 0.24 | 0.32 |
| 20 | 0.16 | 0.32 | 0.48 | 0.65 |
| 30 | 0.24 | 0.48 | 0.72 | 0.97 |
| 40 | 0.32 | 0.64 | 0.97 | 1.30 |
| 50 | 0.40 | 0.80 | 1.21 | 1.62 |
| 100 | 0.80 | 1.60 | 2.41 | 3.25 |

COATED OPTICAL FIBER PRODUCING APPARATUS AND COATED OPTICAL FIBER PRODUCING METHOD

RELATED APPLICATIONS

This application is the U.S. National Phase under 35 U.S.C. §371 of International Application No. PCT/JP2009/054687, filed on Mar. 11, 2009, which in turn claims the benefit of Japanese Application No. 2008-148487, filed on Jun. 5, 2008, the disclosures of which Applications are incorporated by reference herein.

TECHNICAL FIELD

The present invention relates to an apparatus and method of producing a coated optical fiber which has a glass optical fiber and a resin layer coated on the outer periphery thereof and which is wound onto a bobbin in a state of being provided with a desired twist. Furthermore, the "twist" provided to the coated optical fiber is provided to the coated optical fiber by twisting the coated optical fiber, and the direction of that twisting is alternately inverted along the lengthwise direction of the coated optical fiber.

BACKGROUND ART

In optical communication systems using optical fibers for the optical signal transmission paths, when the polarization mode dispersion of the optical fiber is excessively large, deterioration of the pulse waveform of signal light guided by that optical fiber increases resulting in deterioration of transmission capacity. Thus, optical fibers are required to have a low level of polarization mode dispersion.

Patent Document 1 discloses a technology of producing a coated optical fiber in which resin coating is carried out on the surface of a glass optical fiber for use as an optical fiber having low polarization mode dispersion. Namely, in the technology disclosed in Patent Document 1, polarization mode dispersion is reduced by providing a twist to the coated optical fiber by a twist provider and periodically changing the direction of that twist relative to the lengthwise direction. In addition, Patent Document 1 also describes that the amount of twist provided increases the shorter the free path line of the coated optical fiber downstream of the twist provider (hereinafter referred to as a downstream free path line), and that this is preferable in terms of reducing polarization mode dispersion.

Patent Document 1: U.S. Pat. No. 7,317,855

DISCLOSURE OF THE INVENTION

Problems that the Invention is to Solve

The present inventors have examined conventional coated optical fiber producing technologies, and as a result, have discovered the following problems. That is, in Patent Document 1, there were no studies conducted on the free path line of a coated optical fiber upstream of a twist provider (hereinafter referred to as an upstream free path line).

The present invention was completed as a result of the inventors of the present invention finding that there are cases in which an adequate amount of twist cannot be provided to a coated optical fiber depending on the length of the upstream free path line, and an object of the present invention is to provide a coated optical fiber producing apparatus and coated optical fiber producing method of producing a coated optical fiber in which polarization mode dispersion is adequately reduced by providing an adequate amount of twist.

Means for Solving the Problems

The producing apparatus and producing method according to the present invention are a producing apparatus and producing method of producing a coated optical fiber wound onto a bobbin in a state of being provided with a twist (alternate torsion), and the coated optical fiber comprises a glass optical fiber and a resin layer coated on an outer periphery thereof. In addition, the glass optical fiber comprises a silica glass core region and a silica glass cladding region provided on an outer periphery of the core region.

The producing apparatus according to the present invention comprises a twist provider, an upstream twist inhibiting roller, a twist non-inhibiting roller, and a winder for winding the coated optical fiber, to which the twist has been provided, onto a bobbin. The twist provider provides the twist to the coated optical fiber. The upstream twist inhibiting roller is arranged upstream of the twist provider with respect to the traveling direction of the coated optical fiber, and inhibits a rotation of the coated optical fiber around the axis of the coated optical fiber with no twist. The twist non-inhibiting roller is arranged between the upstream twist inhibiting roller and the twist provider or between a feeder and the twist provider, and does not inhibit the rotation of the coated optical fiber around the axis of the coated optical fiber. The twist non-inhibiting roller adjusts a path line length between the upstream twist inhibiting unit and the twist provider by maintaining the path line of the coated optical fiber located between the upstream twist inhibiting roller and the twist provider or between the feeder and the twist provider in a bent state. The winder winds the coated optical fiber to which the twist has been provided. The producing method according to the present invention produces a coated optical fiber wound onto a bobbin in a state of being provided with the twist, by using a producing apparatus comprising a structure as described above.

In addition, the producing apparatus according to the present invention can be applied to a wire drawing apparatus or a rewinding apparatus and the like, and in such cases, the producing apparatus comprises a feeder functioning as an upstream twist inhibiting unit (corresponding to an upstream twist inhibiting roller) that feeds the coated optical fiber with no twist and inhibits the rotation of the coated optical fiber by the twist generated downstream. Furthermore, in the case the producing apparatus is applied as a wire drawing apparatus, a capstan roller of the wire drawing apparatus functions as a feeder, while in the case the producing apparatus is applied as a rewinding apparatus, a supply bobbin, on which the coated optical fiber with no twist is wound, functions as a feeder. The producing method according to the present invention also enables the production of a coated optical fiber wound onto a bobbin in the state of being provided with twist by a producing apparatus comprising such a structure.

In the producing apparatus and producing method according to the present invention, the twist non-inhibiting roller has a cross-sectional shape that does not inhibit rotation of the coated optical fiber around the axis of the coated optical fiber. For example, this twist non-inhibiting roller has, as the guide groove of the coated optical fiber, a U-shaped groove whose cross-section is formed into a U shape, or a flat bottom groove whose bottom is formed to have a wide width. Namely, the guide groove of the twist non-inhibiting roller preferably has an adequate groove width to a degree that does not inhibit the twist-induced rotation of the coated optical fiber.

In the producing apparatus and producing method according to the present invention in particular, in the case the twist is not provided to a portion of the coated optical fiber located upstream of the rollers but is provided at a constant rate of 10 turns/m (hereinafter referred to as twist rate) to a portion located downstream of the rollers, the roller for which the twist rate of the portion of the coated optical fiber located upstream of the rollers is a maximum of 30% or more relative to the twist rate of the portion located downstream of the rollers is the twist non-inhibiting roller. Namely, in the case of the twist non-inhibiting roller, when the twist rate (TR) of the portion of the coated optical fiber located downstream of the rollers is 10 turns/m, then the maximum TR of the portion located upstream of the rollers is 3 turns/m or more. On the other hand, in the case that the twist is not provided to a portion of the coated optical fiber located upstream of the rollers but is provided at a constant rate of 10 turns/m to the portion located downstream of the rollers, the roller for which the twist rate of the portion of the coated optical fiber located upstream of the rollers is at maximum 15% or less relative to the twist rate of the portion located downstream of the rollers is the twist inhibiting roller. Namely, in the case of the twist inhibiting roller, when the TR (twist rate) in the portion of the coated optical fiber located downstream of the rollers is 10 turns/m, then the maximum TR of the portion located upstream of the rollers is 1.5 turns/m.

In the producing method according to the present invention, in a configuration provided with an upstream twist inhibiting roller, a twist non-inhibiting roller, a twist provider and a winder, a downstream twist inhibiting roller may be arranged downstream of the twist provider with respect to the traveling direction of the coated optical fiber for inhibiting rotation of the coated optical fiber around the axis of the coated optical fiber. In this case, when twist period is defined as $L_P$, the twist amplitude of the twist provider is defined as $\gamma_r$, the twist amplitude $\gamma_w$ of the downstream twist inhibiting roller is assumed to be 1 turn/m or more, and the length of the path line of the coated optical fiber from the twist provider to the downstream twist inhibiting roller is defined as $L_2$, then the positional relationship among the upstream twist inhibiting roller, the twist provider and the downstream twist inhibiting roller is preferably set such that the length $L_1$ of the path line of the coated optical fiber from the upstream twist inhibiting roller to the twist provider satisfies the relationship set forth in the following formulas (1a) and (1b).

$$L_1 = \frac{L_p}{2\pi\sqrt{(\gamma_r TRF_2)^2 - 1}} \quad (1a)$$

$$TRF_2 = \frac{1}{\sqrt{(2\pi L_2/L_p)^2 + 1}} \quad (1b)$$

Additionally, in the producing method according to the present invention, in a configuration provided with a feeder, a twist non-inhibiting roller, a twist provider and a winder as well, a downstream twist inhibiting roller may be arranged downstream of the twist provider with respect to the traveling direction of the coated optical fiber for inhibiting rotation of the coated optical fiber around the axis of the coated optical fiber. In this case, when the twist period is defined as $L_P$, the twist amplitude of the twist provider is defined as $\gamma_r$, the twist amplitude $\gamma_w$ of the downstream twist inhibiting roller is assumed to be 1 turn/m or more, and the length of the path line of the coated optical fiber from the twist provider to the downstream twist inhibiting roller is defined as $L_2$, then the positional relationship among the supply bobbin, twist provider and downstream twist inhibiting roller is preferably set such that the length $L_1$ of the path line of the coated optical fiber from the supply bobbin to the twist provider satisfies the relationship set forth in the following formulas (2a) and (2b).

$$L_1 = \frac{L_p}{2\pi\sqrt{(\gamma_r TRF_2)^2 - 1}} \quad (2a)$$

$$TRF_2 = \frac{1}{\sqrt{(2\pi L_2/L_p)^2 + 1}} \quad (2b)$$

The producing method according to the present invention can be realized by a configuration provided with a twist provider for providing the twist to the coated optical fiber, and an upstream roller arranged upstream of the twist provider with respect to the traveling direction of the coated optical fiber. In this case, when the twist period is defined as $L_P$ and the twist amplitude of the twist provider is defined as $\gamma_r$, the positional relationship between the upstream roller and the twist provider is set such that the length $L_1$ of the pass line of the coated optical fiber from the upstream roller to the twist provider satisfies the relationship set forth in the following formula (3). A coated optical fiber to which the twist has been provided can then be produced by passing the coated optical fiber over the upstream roller and the twist provider in this order.

$$L_1 \geq \frac{L_p}{2\pi\sqrt{\gamma_r^2 - 1}} \quad (3)$$

The producing method according to the present invention can also be realized by a configuration provided with a feeder functioning as an upstream twist inhibiting roller and a twist provider. The twist provider provides the twist to the coated optical fiber. The feeder is arranged upstream of the twist provider with respect to the traveling direction of the coated optical fiber. In this case, when the twist period is defined as $L_P$ and the twist amplitude of the twist provider is defined as $\gamma_r$, the positional relationship between the twist provider and the feeder is set such that the length $L_1$ of the path line of the coated optical fiber from the feeder to the twist provider satisfies the relationship set forth in the following formula (4). A coated optical fiber to which the twist has been provided can then be produced by passing the coated optical fiber over the feeder and the twist provider in this order.

$$L_1 \geq \frac{L_p}{2\pi\sqrt{\gamma_r^2 - 1}} \quad (4)$$

The producing method according to the present invention can also be realized by a configuration provided with a twist provider and an upstream roller. The twist provider provides the twist to the coated optical fiber. The upstream roller is arranged upstream of the twist provider with respect to the direction traveling of the coated optical fiber. In this case, when the twist period is assumed to be 20 m, and the product of the twist amplitude $\gamma_r$ of the twist provider and the twist release factor $TRF_2$ after the twist provider ($\gamma_r TRF_2$) is assumed to be 10 turns/m, the positional relationship between the twist provider and the upstream roller is set such that the length $L_1$ of the path line of the coated optical fiber from the upstream roller to the twist provider is 1 m or more. A coated optical fiber to which the twist has been provided can then be produced by passing the coated optical fiber over the upstream roller and the twist provider in this order.

In addition, in the case of realizing the producing method according to the present invention by employing a configuration provided with a twist provider and a feeder, when the twist period is assumed to be 20 m and the product of the twist amplitude $\gamma_r$ of the twist provider and the twist release factor $TRF_2$ after the twist provider ($\gamma_r TRF_2$) is assumed to be 10 turns/m, the positional relationship between the feeder and the twist provider may also be set such that the length $L_1$ of the path line of the coated optical fiber from the feeder to the twist provider is 1 m or more. A coated optical fiber to which the twist has been provided can also be produced in accordance with this positional relationship by passing the coated optical fiber over the feeder and the twist provider in this order.

Effects of the Invention

In accordance with the present invention, a coated optical fiber can be produced to which an adequate amount of twist is provided and in which polarization mode dispersion is adequately reduced.

BRIEF DESCRIPTION OF THE DRAWINGS

FIG. 8 is a table summarizing values of length $L_1$ of an upstream free path line required to realize each value of twist amplitude $\gamma_w$ (turns/m) for each value of twist period $L_P$ (m) in the case $\gamma_r TRF_2$ is 5 turns/m;

FIG. 9 is a table summarizing values of length $L_1$ of an upstream free path line required to realize each value of twist amplitude $\gamma_w$ (turns/m) for each value of twist period $L_P$ (m) in the case $\gamma_r TRF_2$ is 10 turns/m;

FIG. 10 is a table summarizing values of length $L_1$ of an upstream free path line required to realize each value of twist amplitude $\gamma_w$ (turns/m) for each value of twist period $L_P$ (m) in the case $\gamma_r TRF_2$ is 20 turns/m;

DESCRIPTION OF THE REFERENCE NUMERALS

Figure 1A:
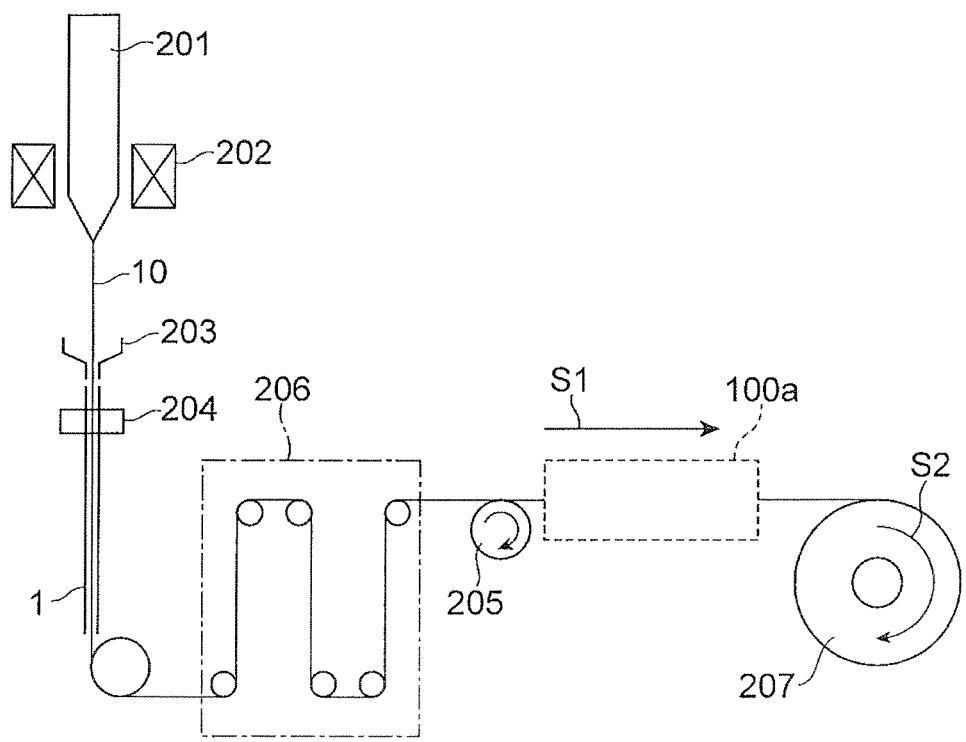
FIGS. 1A and 1B are drawings showing the configuration of a wire drawing apparatus and a rewinding apparatus respectively incorporating the coated optical fiber producing apparatus according to in the present invention.

1 . . . coated optical fiber; 11 . . . upstream twist inhibiting roller; 12, 12a, 12b, 12c, 12d . . . twist non-inhibiting roller; 13 . . . twist provider; 14 . . . downstream twist inhibiting roller; 100 . . . producing apparatus (coated optical fiber producing apparatus); 100a . . . twist providing unit; 301 . . . supply bobbin; and 207, 302 . . . takeup bobbin.

BEST MODES FOR CARRYING OUT THE INVENTION

In the following, embodiments of a coated optical fiber producing apparatus and coated optical fiber producing method according to the present invention will be explained in detail with reference to the attached drawings. In the description of the drawings, identical or corresponding components are designated by the same reference numerals, and overlapping description is omitted.

Figure 1B:
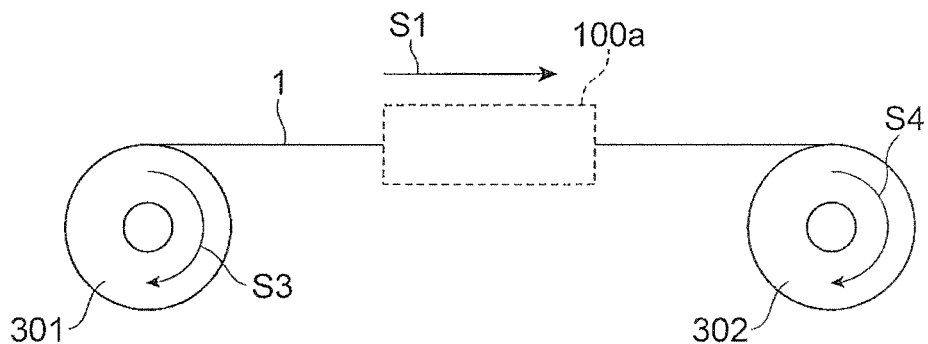

The present invention relates to a coated optical fiber producing apparatus and coated optical fiber producing method of producing a coated optical fiber wound onto a bobbin in a state of being provided with a desired amount of twist, and more specifically, are incorporated in an optical fiber wire drawing apparatus as shown in FIG. 1A or a rewinding apparatus as shown in FIG. 1B.

The wire drawing apparatus, shown in FIG. 1A, comprises a heater 202 for heating the end of an optical fiber preform 201, a resin coating apparatus 203, an ultraviolet curing apparatus 204, a twist release unit 206, a capstan roller 205 and a takeup bobbin 207. A glass optical fiber 10 is pulled out over the capstan roller 205 from a distal end of the optical fiber parent material 201 heated by the heater 202 as a result of the takeup bobbin 207 rotating in the direction indicated by arrow S2. A resin layer is coated onto the surface of the glass optical fiber 10 by the resin coating apparatus 203 resulting in the obtaining of a coated optical fiber 1. Unwanted twist is added to the coated optical fiber 1 during the time it is stretched over the capstan roller 205. In order to release this unwanted twist added to the coated optical fiber 1 in this manner, the twist release unit 206 is arranged in front of the capstan roller 205 in the wire drawing apparatus shown in FIG. 1A. The twist release unit 206 alleviates the twisted state of the coated optical fiber 1 coated with resin by forming a spinning state in which a core region is added with alternate torsion in the glass optical fiber 10 during drawing. Furthermore, the capstan roller 205 is arranged between the twist release unit 206 and the takeup bobbin 207. The producing apparatus according to the present invention is constituted by the takeup bobbin 207, the capstan roller 205, and a twist providing unit 100a as a main component of the producing apparatus according to the present invention, and in this twist providing unit 100a, a desired twist is provided to the coated optical fiber 1 which is traveling in the direction indicated by arrow S1. In this configuration, the capstan roller 205 functions as a feeder of the coated optical fiber 1 with no twist.

On the other hand, as shown in FIG. 1B, the rewinding apparatus incorporating the producing apparatus according to the present invention comprises a supply bobbin 301 on which the coated optical fiber 1 is wound, the twist providing unit 100a and a takeup bobbin 302. The coated optical fiber 1, wound onto the supply bobbin 301, is rewound onto the takeup bobbin 302 as a result of the supply bobbin 301 rotating in the direction indicated by arrow S3 and the takeup bobbin 302 rotating in the direction indicated by arrow S4. The twist providing unit 100a provides a desired twist to the coated optical fiber 1 traveling along the direction indicated by arrow S1 between the supply bobbin 301 and the takeup bobbin 302.

Figure 2A:
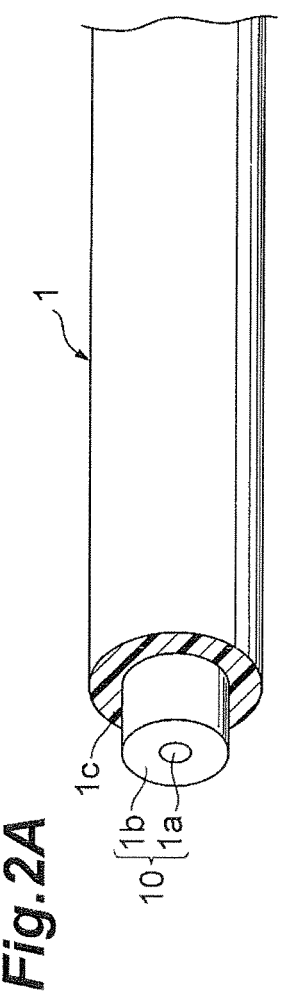
FIGS. 2A to 2C are drawings for explaining the production of coated optical fiber and the providing of twist to a coated optical fiber.
Figure 2B:
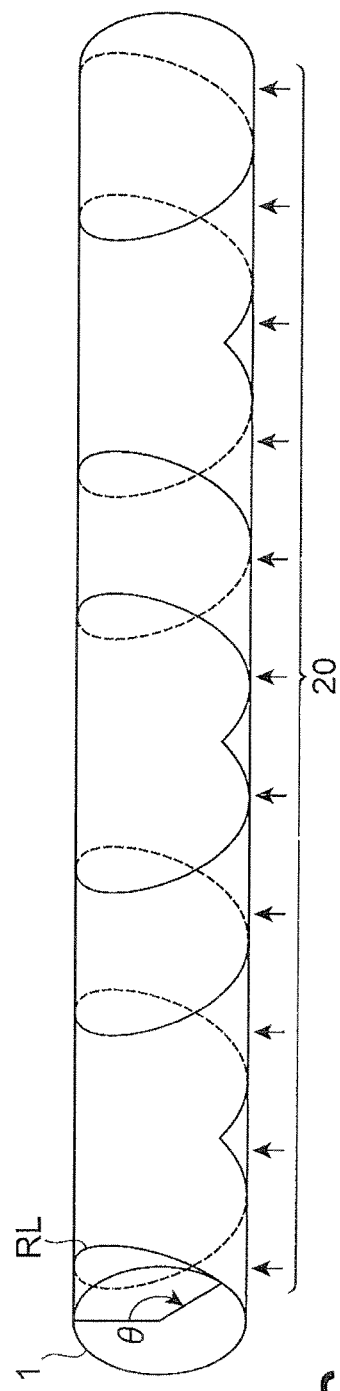
Figure 2C:
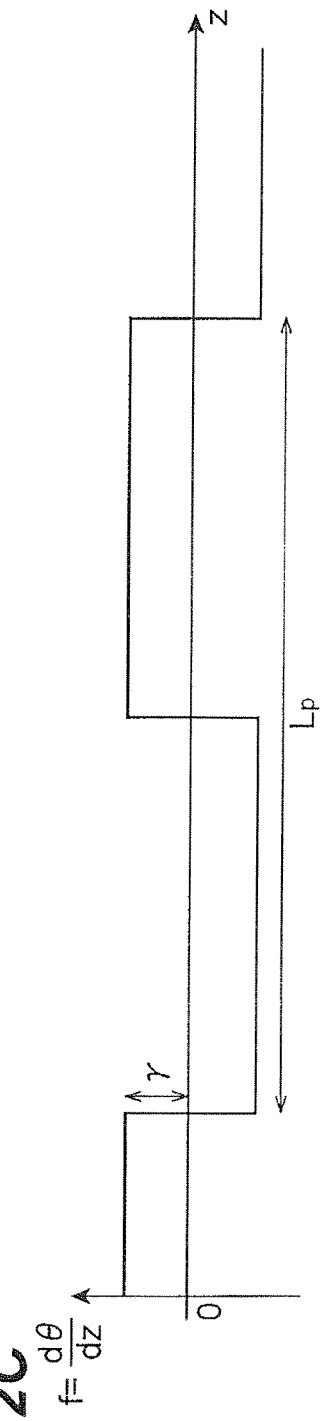

FIGS. 2A top 2C are drawings for explaining the structure of the coated optical fiber 1 (before being provided with the twist) obtained from the wire drawing apparatus shown in FIG. 1A and the providing of twist to the coated optical fiber 1. As shown in FIG. 2A, the coated optical fiber 1 is provided with the glass optical fiber 10, and a resin layer 1c provided on the outer periphery of the glass optical fiber 10. The glass optical fiber 10 comprises a silica glass core region 1a extending along a predetermined axis, and a silica glass cladding region 1b provided on the outer periphery of the core region 1a and having a lower refractive index than the core region 1a.

In addition, FIG. 2B shows a perspective view of the coated optical fiber 1, and a reference line RL indicating twist applied to the coated optical fiber 1, and a direction 20 in which lateral pressure is applied to the coated optical fiber 1, are also shown in FIG. 2B. FIG. 2C shows the axial direction distribution of twist rate (amount of rotation per fiber unit length in a portion rotated in one direction) in the coated optical fiber 1. A desired amount of twist in the form of elastic twisting accompanying stress is provided to the coated optical fiber 1 by the apparatus according to the present invention. In FIG. 2C, when the position in the axial direction of the coated optical fiber 1 is represented by z, and the rotational position of the reference line 11 at a position z is represented by θ, twist rate in the form of the number of rotations per unit length attributable to twisting is typically expressed as a function of position z with the equation $f(z)=d\theta/dz$. In addition, as shown in the area (c) of FIG. 2, twist rate $f(z)$ is expressed as a wave of amplitude (maximum value of twist rate in a single period) γ and period $L_P$.

Figure 3:
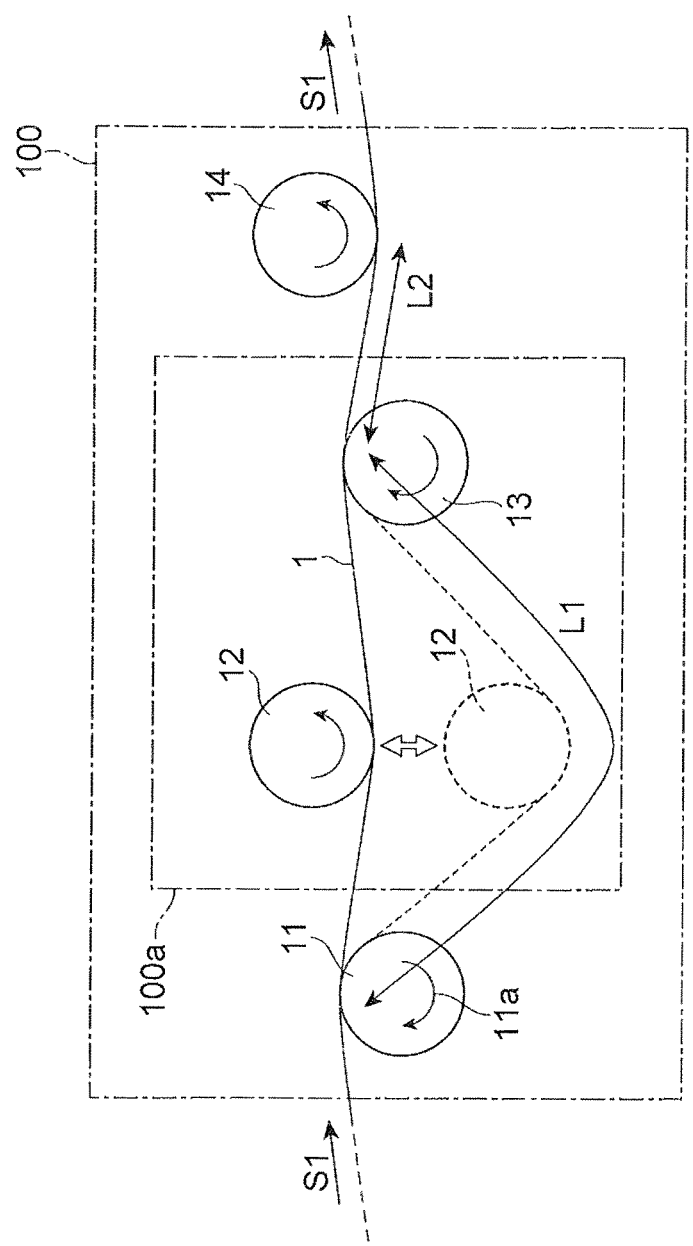
FIG. 3 is a drawing for explaining the path line of a coated optical fiber in the coated optical fiber producing apparatus according to the present invention.

FIG. 3 is a drawing for explaining the path line of the coated optical fiber 1 in the producing apparatus according to the present invention. In FIG. 3, a roller 11, a roller 12, a twist provider 13 and a roller 14 are provided in order along the path line of the coated optical fiber 1 traveling along the direction indicated by arrow S1. The twist provider 13 specifically provides the twist to the coated optical fiber 1.

The roller 11 is arranged upstream of the twist provider 13 with respect to the traveling direction of the coated optical fiber 1. The roller 11 is an upstream twist inhibiting roller that inhibits the rotation of the coated optical fiber 1 around the axis of the coated optical fiber 1. For example, the upstream twist inhibiting roller 11 may be the supply bobbin 301 in the rewinding apparatus shown in FIG. 1B, or may be a feeder for supplying the coated optical fiber 1 such as the capstan roller 205 in a wire drawing apparatus (FIG. 1A).

The roller 12 is arranged between the upstream twist inhibiting roller 11 and the twist provider 13, and path line length $L_1$ of the coated optical fiber 1 located between the upstream twist inhibiting roller 11 and the twist provider 13 is secured by forming the path line by bending the coated optical fiber 1. In addition, the roller 12 may also have a function that adjusts the path line length $L_1$ of the coated optical fiber 1 by being movably composed or being composed to enable adjustment of the position thereof. The roller 12 is a twist non-inhibiting roller that does not inhibit the rotation of the coated optical fiber 1 around the axis of the coated optical fiber 1.

The roller 14 is arranged downstream of the twist provider 13 with respect to the traveling direction of the coated optical fiber 1 so that the length of the path line of the coated optical fiber 1 from the twist provider 13 becomes $L_2$. This roller 14 is a downstream twist inhibiting roller that inhibits the rotation of the coated optical fiber 1 around the axis of the coated optical fiber 1. For example, the downstream twist inhibiting roller 14 may be the takeup bobbin 207 in the wire drawing apparatus shown in FIG. 1A. In addition, the downstream twist inhibiting roller 14 may be the takeup bobbin 302 in the rewinding apparatus shown in FIG. 1B.

As described above, the producing apparatus according to the present invention (producing apparatus of the coated optical fiber 1 provided with a desired twist) may draw the optical fiber perform 201 and provide the twist to the coated optical fiber 1 prior to winding the resulting coated optical fiber 1, (see FIG. 1A), or may provide the twist to the coated optical fiber 1 when rewinding the previously wound coated optical fiber 1 (see FIG. 1B).

Figure 5A:
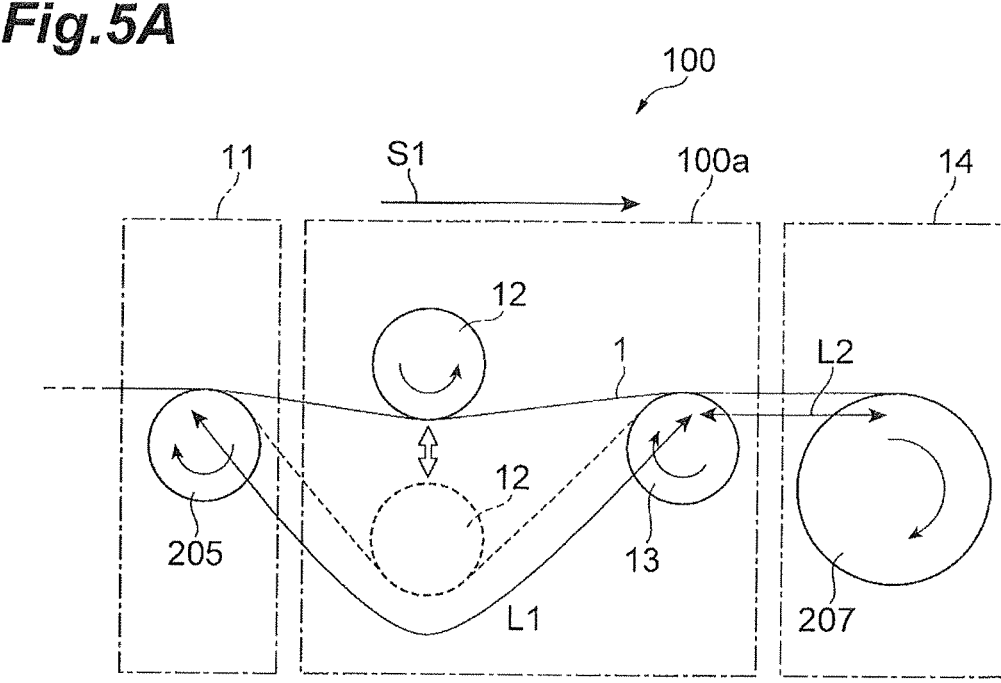
FIGS. 5A and 5B are drawings showing the specific configuration of the coated optical fiber producing apparatus according to the present invention applied to a wire drawing apparatus and a rewinding apparatus.
Figure 5B:
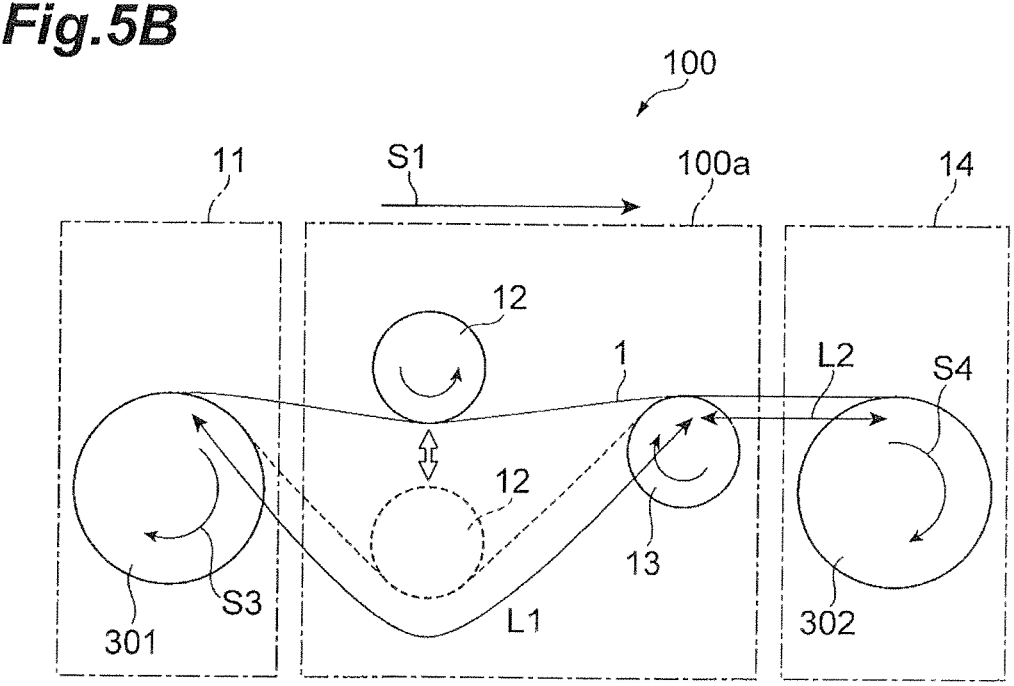

FIGS. 5A and 5B are drawings showing the specific configuration of the coated optical fiber producing apparatus according to the present invention which is applied to a wire drawing apparatus and a rewinding apparatus. The coated optical fiber producing method according to the present invention is carried out using the specific configuration shown in FIGS. 5A and 5B.

As shown in FIG. 5A, a production apparatus 100, applied to the wire drawing apparatus shown in FIG. 1A, comprises the capstan roller 205, the twist providing unit 100a and the takeup bobbin 207. The capstan roller 205 corresponds to the upstream twist inhibiting roller 11 in FIG. 3, and functions as a feeder that supplies the coated optical fiber 1 with no twist to the twist providing unit 100a. In addition, the uptake bobbin 207 corresponds to the downstream twist inhibiting roller 14 shown in FIG. 3, and functions as a winder for winding the coated optical fiber 1 to which a desired twist has been provided by the twist providing unit 100a.

On the other hand, as shown in FIG. 5B, the producing apparatus 100 applied to the rewinding apparatus shown in FIG. 1B is provided with the supply bobbin 301, the twist providing unit 100a and the takeup bobbin 302. The supply bobbin 301 corresponds to the upstream twist inhibiting roller 11 in FIG. 3, and functions as a feeder for supplying the coated optical fiber 1 with no twist to the twist providing unit 100a. In addition, the takeup bobbin 302 corresponds to the downstream twist inhibiting roller 14 shown in FIG. 3, and functions as a winder for winding the coated optical fiber 1 which is provided with a desired twist by the twist providing unit 100a.

Furthermore, in either of the configurations described above, other twist inhibiting rollers are not present between the upstream twist inhibiting roller 11 and the twist provider 13 or between the twist provider 13 and the downstream twist inhibiting roller 14. Thus, the path line of the coated optical fiber 1 located between the upstream twist inhibiting roller 11 and the twist provider 13 is the upstream free path line, and the length of this upstream free path line is set to $L_1$. In addition, the path line of the coated optical fiber 1 located between the twist provider 13 and the downstream twist inhibiting roller 14 is the downstream free path line, and the length of this downstream free path line is set to $L_2$ as described.

Figure 4A:
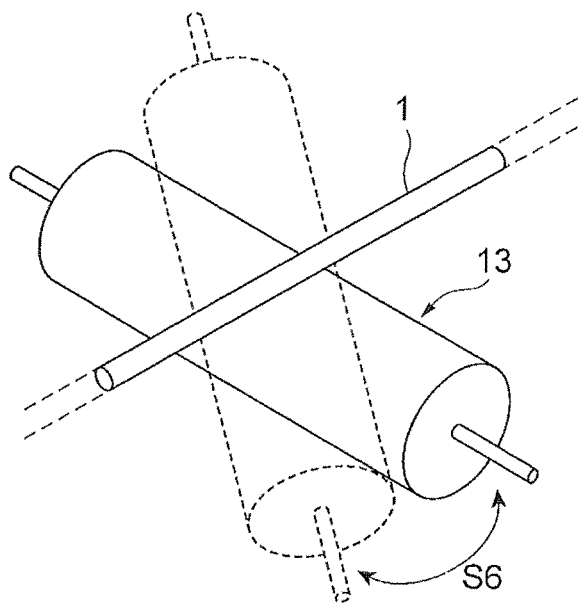
FIGS. 4A and 4B are drawings for explaining a specific configuration of the twist provider shown in FIG. 3 and another configuration of a twist non-inhibiting roller.
Figure 4B:
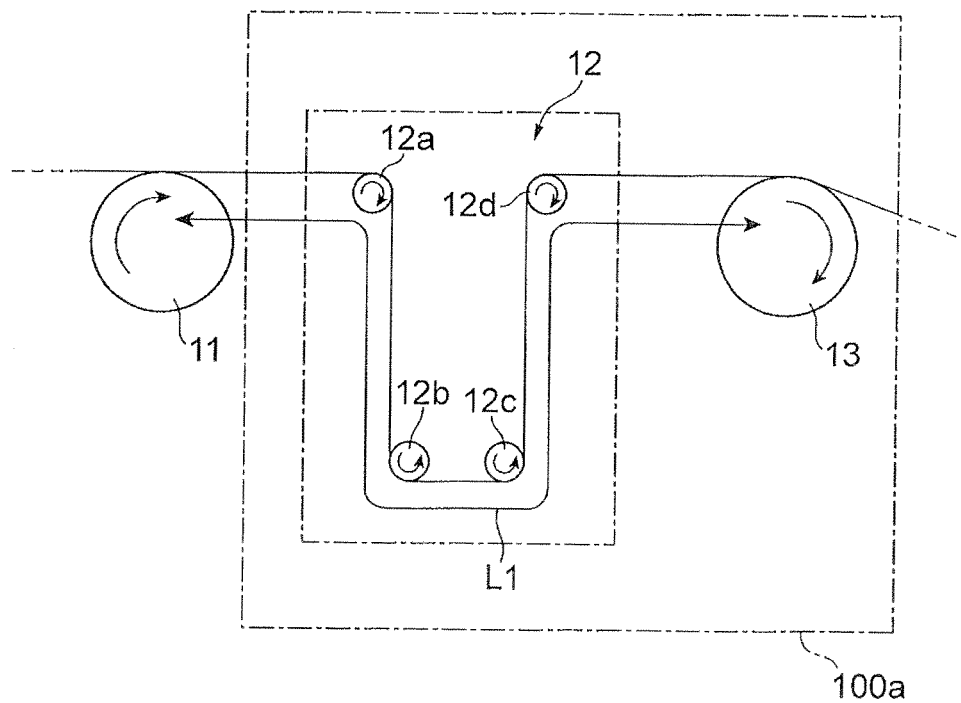

More specifically, as shown in FIG. 4A, the twist provider 13 provides the twist to the coated optical fiber 1 such that the rotation direction of torsion is inverted (see FIG. 2B) by swinging in the direction indicated by arrow S6. Furthermore, the twist non-inhibiting roller 12 may be constituted by a plurality of rollers 12a to 12d, and in this case as well, the length of the upstream free path line can be arbitrarily adjusted within a limited space as indicated in FIG. 4B. In addition, in the subsequent explanation, the twist provided to the coated optical fiber 1 by this type of twist provider 13 is expressed as a sine function of a twist period $L_P$ having as a variable thereof a position z of the coated optical fiber 1 in the lengthwise direction. The twist amplitude of the twist provider 13 is defined as $\gamma_r$. In addition, the twist amplitude of the downstream twist inhibiting roller 14 is defined as $\gamma_w$.

The twist rate for the coated optical fiber 1 in the twist provider 13 (amount of rotation per fiber unit length in a portion rotated in one direction) is expressed as R(z). The amount of twist accumulated in the coated optical fiber 1 in the upstream free path line located upstream from the twist provider 13 (cumulative amount of rotation at an intermediate time based on positive rotation and negative rotation constituting one set) is expressed as $TW_1(z)$. The amount of twist moving from the upstream free path line to the downstream free path line due to travel of the coated optical fiber 1 itself is expressed as $TW_{12}(z)$. The amount of twist accumulated in the coated optical fiber 1 in the downstream free path line after the twist provider 13 is expressed as $TW_2(z)$. The amount of twist moving from the downstream free path line to the downstream twist inhibiting roller 14 is expressed as $TW_w(z)$.

At this time, the relationships represented by the following formulas (5) to (8) exist among the above-mentioned parameters.

$$TW_1(z+dz) = TW_1(z) + R(z)dz - TW_{12}(z) \quad (5)$$

$$TW_2(z+dz) = TW_2(z) - R(z)dz + TW_{12}(z) - TW_w(z) \quad (6)$$

$$TW_{12}(z) = \frac{TW_1(z)}{L_1} dz \quad (7)$$

$$TW_w(z) = \frac{TW_2(z)}{L_2} dz \quad (8)$$

The following formula (9) is obtained from formulas (5) and (7) above. When this is solved, $TW_1(z)$ is expressed with the following formula (10).

$$\frac{d}{dz} TW_1(z) = R(z) - \frac{TW_1(z)}{L_1} \quad (9)$$

$$TW_1(z) = \exp\left(-\frac{z}{L_1}\right) \cdot \left\{ \int R(z) \exp\left(\frac{z}{L_1}\right) dz + const. \right\} \quad (10)$$

Here, when R(z) is assumed to be expressed with the following formula (11) and the approximation formula of formula (12) is assumed to be valid, the above-mentioned formula (10) is expressed with the following formula (13).

$$R(z) = \gamma_r \sin\left(2\pi \frac{z}{L_p}\right) \quad (11)$$

$$1 >> \exp(-z/L_1) \quad (12)$$

$$\frac{TW_1(z)}{L_1} = \frac{\gamma_r}{\sqrt{(2\pi L_1/L_p)^2 + 1}} \sin\left(2\pi \frac{z}{L_p} + \varphi_1\right). \quad (13)$$

In addition, the following formula (14) is obtained from the above-mentioned formulas (6) to (8). When this is solved, $TW_2(z)$ is expressed with the following formula (15).

$$\frac{d}{dz} TW_2(z) = -R(z) + \frac{TW_1(z)}{L_1} - \frac{TW_2(z)}{L_2} \quad (14)$$

$$TW_2(z) = \exp\left(-\frac{z}{L_2}\right) \cdot \left\{ \int \left(-R(z) + \frac{TW_1(z)}{L_1}\right) \exp\left(\frac{z}{L_2}\right) dz + const. \right\} \quad (15)$$

In addition, the following formula (17) is obtained by assuming the approximation formula of the following formula (16) to be valid and substituting the formulas (11) and (13) into the formula (15).

$$1 >> \exp(-z/L_2) \quad (16)$$

$$\frac{TW_2(z)}{L_2} = \gamma_r \frac{2\pi L_1/L_p}{\sqrt{(2\pi L_1/L_p)^2 + 1}} \frac{1}{\sqrt{(2\pi L_2/L_p)^2 + 1}} \sin\left(2\pi \frac{z}{L_p} + \varphi_2\right) \quad (17)$$

The amplitude of the sine function on the right side of this formula (17) is the twist amplitude $\gamma_w$ of the downstream twist inhibiting roller 14. $\gamma_w$ is expressed with the following formulas (18) to (20).

$$\gamma_w = \gamma_r \frac{2\pi L_1/L_p}{\sqrt{(2\pi L_1/L_p)^2 + 1}} \frac{1}{\sqrt{(2\pi L_2/L_p)^2 + 1}} = \gamma_r \cdot TRF_1 \cdot TRF_2 \quad (18)$$

$$TRF_1 = \frac{2\pi L_1/L_p}{\sqrt{(2\pi L_1/L_p)^2 + 1}} \quad (19)$$

$$TRF_2 = \frac{1}{\sqrt{(2\pi L_2/L_p)^2 + 1}} \quad (20)$$

Figure 6:
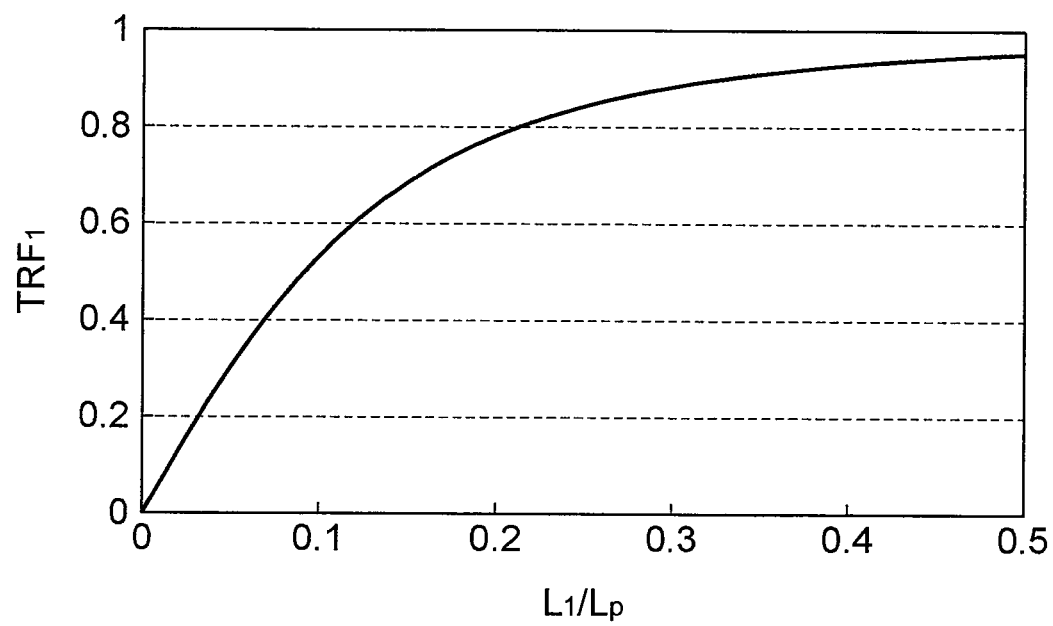
FIG. 6 is a graph indicating the relationship between $TRF_1$ and a ratio ($L_1/L_P$)

$TRF_1$ in the formula (19) is a function having $L_1/L_P$ as a variable thereof, and demonstrates the trend indicated by the graph of FIG. 6. Namely, the longer $L_1$ is relative to $L_P$, the larger the value of $TRF_1$ as it approaches 1. Thus, the twist amplitude $\gamma_w$ of the downstream twist inhibiting roller 14 increases.

Figure 7:
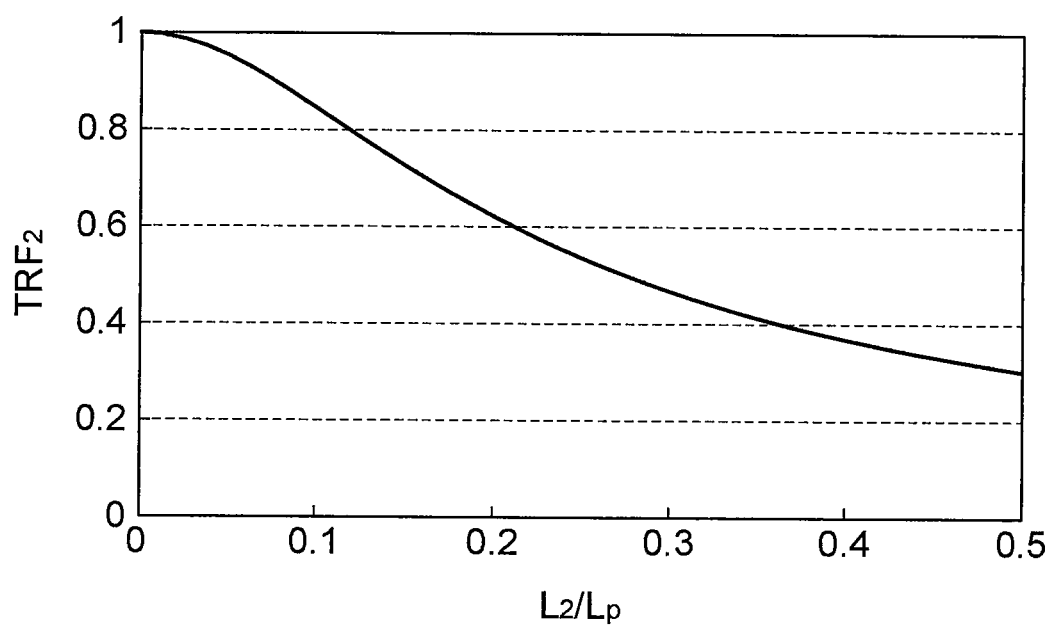
FIG. 7 is a graph indicating the relationship between $TRF_2$ and a ratio ($L_2/L_P$)

$TRF_2$ in the formula (20) is a function having $L_2/L_P$ as a variable thereof, and demonstrates the trend indicated by the graph of FIG. 7. Namely, the shorter $L_2$ is relative to $L_P$, the larger the value of $TRF_2$ as it approaches 1. Thus, the twist amplitude $\gamma_w$ of the downstream twist inhibiting roller 14 increases.

In addition, the longer $L_1$ and the shorter $L_2$ are relative to $L_P$, the closer the twist amplitude $\gamma_w$ of the downstream twist inhibiting roller 14 approaches the twist amplitude $\gamma_r$ of the twist provider 13.

Patent Document 1 does not mention the relationship between length $L_1$ of the upstream free path line between the upstream twist inhibiting roller 11 and the twist provider 13 and twist amplitude $\gamma_w$ of the downstream twist inhibiting roller 14.

It is easy to shorten the length $L_2$ of the downstream free path line between the twist provider 13 and the downstream twist inhibiting roller 14. However, it is not necessarily easy to increase the length $L_1$ of the upstream free path line between the upstream twist inhibiting roller 11 and the twist provider 13. The following provides an explanation of the minimum value required for $L_1$.

The following formula (21) is obtained by solving $L_1/L_P$ using a variation of the above-mentioned formula (18). Since the following formula (22) is valid in principle, the formula (21) is a function representing a monotonic increase relative to $\gamma_w$.

$$\frac{L_1}{L_p} = \frac{\gamma_w/\gamma_r TRF_2}{2\pi\sqrt{1-(\gamma_w/\gamma_r TRF_2)^2}} = \frac{1}{2\pi\sqrt{(\gamma_r TRF_2/\gamma_w)^2-1}} \quad (21)$$

$$0 \le \gamma_w/\gamma_r TRF_2 \le 1 \quad (22)$$

It is necessary for the amplitude of the coated optical fiber 1 to be at least 1 turn/m, preferably 2 turns/m or more, more preferably 3 turns/m or more and most preferably 4 turns/m or more.

When at least the following formula (23) is satisfied, then $\gamma_w$ can be made to be 1 turn/m or more and the effect of reducing polarization mode dispersion can be obtained.

$$L_1 = \frac{L_p}{2\pi\sqrt{(\gamma_r TRF_2)^2-1}} \quad (23)$$

When considering the case in which $L_2$ is 0, then $TRF_2$ becomes 1 and the value of $L_1/L_P$ required to realize a desired $\gamma_w$ becomes smaller. When $TRF_2$ is 1, the condition to be satisfied by the minimum $L_1$ for making $\gamma_w$ 1 turn/m or more is expressed as in the following formula (24). In actuality, however, $L_2$ is not 0.

$$\frac{L_1}{L_p} \ge \frac{1}{2\pi\sqrt{\gamma_r^2-1}} \quad (24)$$

Ensuring a value for $L_1$ that satisfies the formula (24) is at least required to provide the twist of 1 turn/m or more at which the effect of reducing mode dispersion reduction is obtained.

FIG. 8 is a table summarizing values of length $L_1$ of the upstream free path line required for realizing each value of twist amplitude $\gamma_w$ for each value of twist period $L_P$ in the case of a $\gamma_r TRF_2$ value of 5 turns/m. FIG. 9 is a table summarizing the values of length $L_1$ of the upstream free path line required for realizing each value of twist amplitude $\gamma_w$ for each value of twist period $L_P$ in the case of a $\gamma_r TRF_2$ value of 10 turns/m. In addition, FIG. 10 is a table summarizing the values of length $L_1$ of the upstream free path line required for realizing each value of twist amplitude for each value of twist period $L_P$ in the case of a $\gamma_r TRF_2$ value of 20 turns/m. In each of FIGS. 8 to 10, the values of twist period $L_P$ are 5, 10, 20, 30, 40, 50 and 100 m, and the values of twist amplitude $\gamma_w$ are 1 turn/m, 2 turns/m, 3 turns/m and 4 turns/m.

The twist amplitude $\gamma_w$ of the coated optical fiber 1 is preferably 3 turns/m or more, and the twist period $L_P$ is preferably 20 m or more. These conditions are satisfied when $L_1$ is 2.39 m or more in the case $\gamma_r TRF_2$ is 5 turns/m, when $L_1$ is 1.00 m or more when $\gamma_r TRF_2$ is 10 turns/m, and when $L_1$ is 0.48 m or more in the case $\gamma_r TRF_2$ is 20 turns/m.

The formula (21) is also expressed in the manner of the following formula (25) by using a variation thereof. This formula (25) indicates the relationship of $\gamma_r$ relative to a desired $\gamma_w$ and L1.

$$\gamma_r = \frac{\gamma_w}{TRF_2} \frac{\sqrt{(2\pi L_1/L_p)^2+1}}{2\pi L_1/L_p} \quad (25)$$

Figure 11:
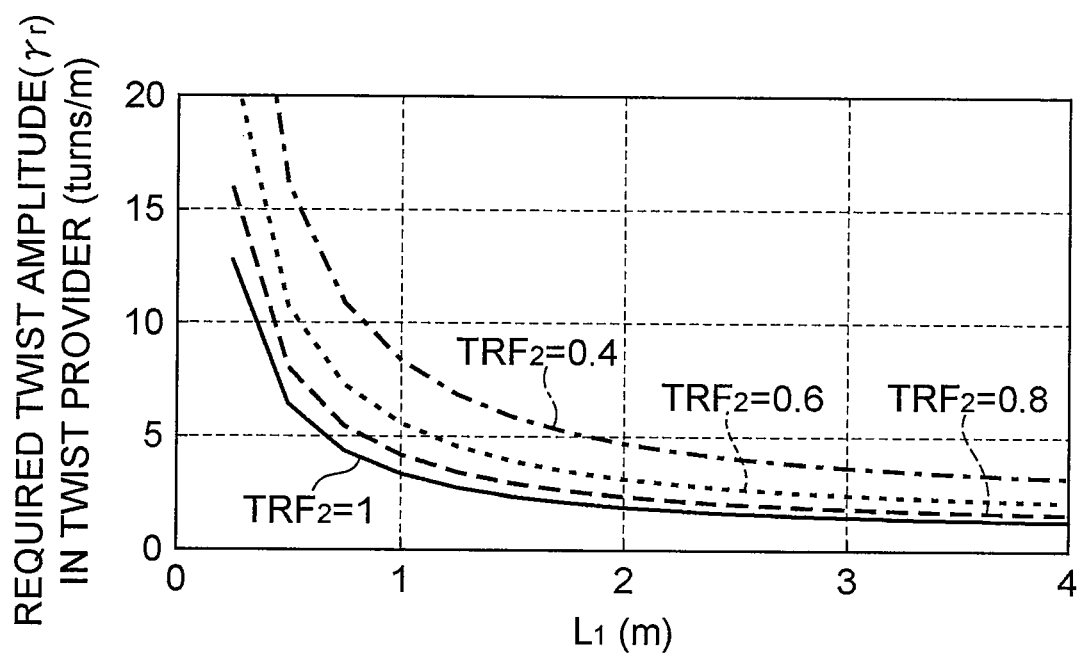
FIG. 11 is a graph indicating the relationship between upstream free path line length $L_1$ and twist amplitude $\gamma_r$ in the case twist amplitude $\gamma_w$ is 1 turn/m.
Figure 12:
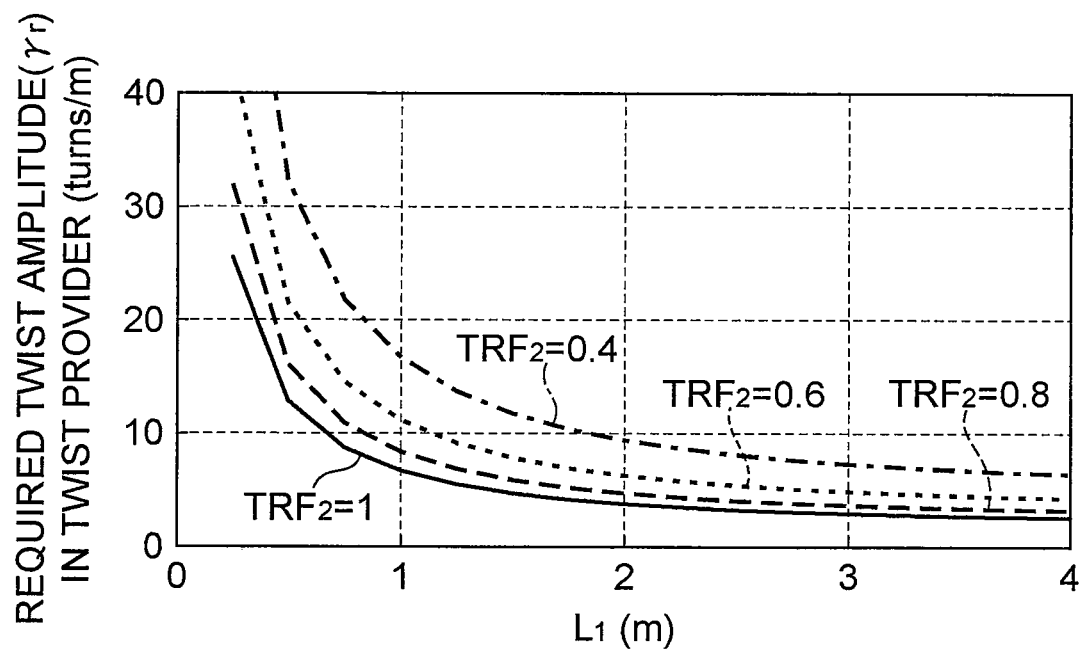
FIG. 12 is a graph indicating the relationship between upstream free path line $L_1$ and twist amplitude $\gamma_r$ in the case twist amplitude $\gamma_w$ is 2 turns/m.
Figure 13:
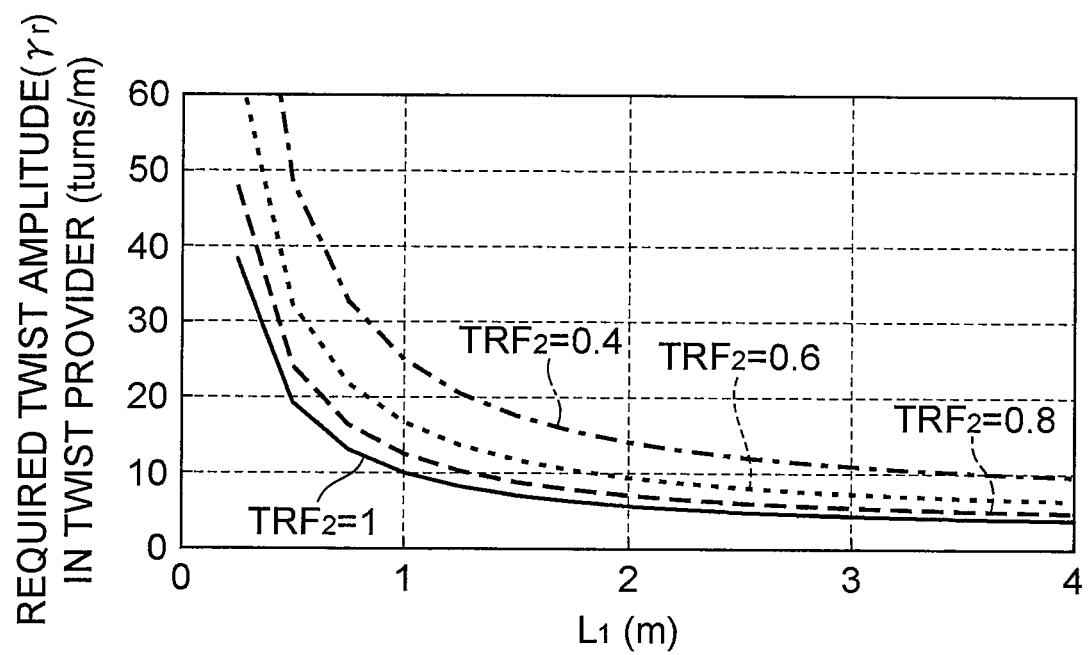
FIG. 13 is a graph indicating the relationship between upstream free path line length $L_1$ and twist amplitude $\gamma_r$ in the case twist amplitude $\gamma_w$ is 3 turns/m.
Figure 14:
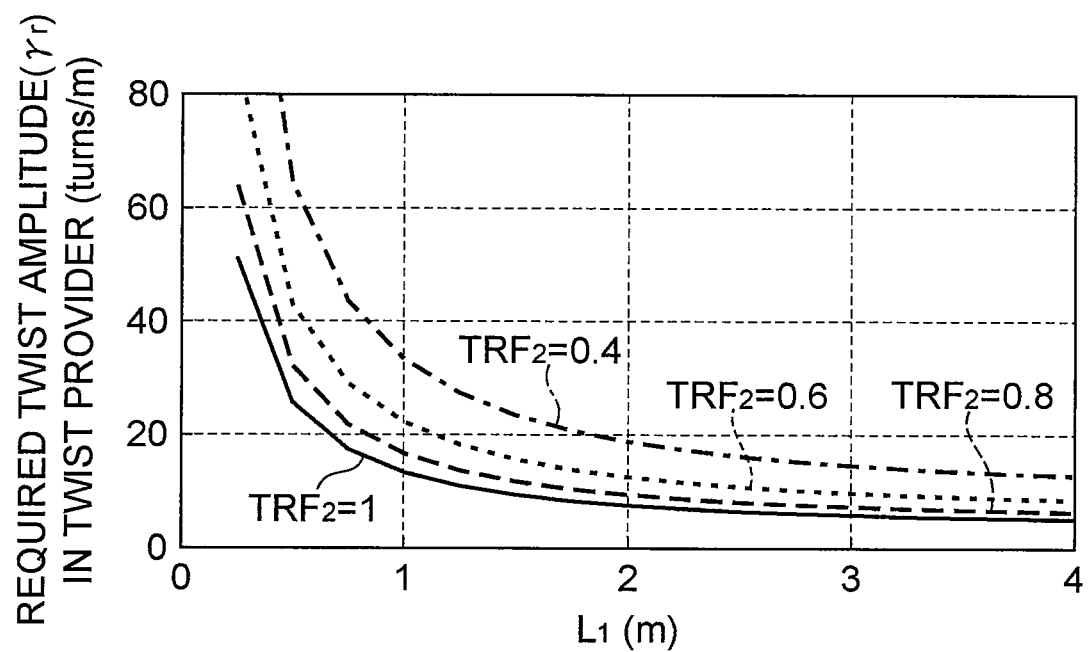
FIG. 14 is a graph indicating the relationship between upstream free path line length $L_1$ and twist amplitude $\gamma_r$ in the case twist amplitude $\gamma_w$ is 4 turns/m.

FIG. 11 is a graph indicating the relationship between upstream free path line length $L_1$ and twist amplitude $\gamma_r$ in the case of a twist amplitude $\gamma_w$ of 1 turn/m. FIG. 12 is a graph indicating the relationship between upstream free path line length $L_1$ and twist amplitude $\gamma_r$ in the case of a twist amplitude $\gamma_w$ of 2 turns/m. FIG. 13 is a graph indicating the relationship between upstream free path line length $L_1$ and twist amplitude $\gamma_r$ in the case of a twist amplitude $\gamma_w$ of 3 turns/m. In addition, FIG. 14 is a graph indicating the relationship between upstream free path line length $L_1$ and twist amplitude $\gamma_r$ in the case of a twist amplitude $\gamma_w$ of 4 turns/m. In each of FIGS. 11 to 14, the twist period $L_P$ is 20 m, and the values of $TRF_2$ are 0.4, 0.6, 0.8 and 1. As can be understood from these FIGS. 11 to 14, the required twist amplitude $\gamma_r$ is larger the shorter the length of $L_1$.

Normally, it is realistic for the twist amplitude $\gamma_r$ to be up to about 20 turns/m. In consideration of twist release of the coated optical fiber 1 after the twist provider 13, it is realistic for $TRF_2$ to be 0.5 and for $\gamma_r TRF_2$ to be about 10 turns/m. Under such conditions, $L_1$ is required to be $0.016L_P$ (m) or more in order for $\gamma_w$ to be 1 turn/m, required to be 0.0324 (m) or more in order for $\gamma_w$ to be 2 turns/m, required to be 0.0504 (m) or more in order for $\gamma_w$ to be 3 turns/m, and required to be 0.0694 (m) or more in order for $\gamma_w$ to be 4 turns/m. When $L_P$ is 20 m, $L_1$ is required to be 0.32 m or more in order for $\gamma_w$ to be 1 turn/m, required to be 0.65 m or more in order for $\gamma_w$ to be 2 turns/m, required to be 1.00 m or more in order for $\gamma_w$ to be 3 turns/m, and required to be 1.39 m or more in order for $\gamma_{am}$ to be 4 turns/m.

Although the effect of reducing polarization mode dispersion is obtained when $\gamma_w$ is 1 turn/m or more, in order to obtain an adequate effect of reducing polarization mode dispersion, $\gamma_w$ is preferably 3 turns/m or more. Thus, $L_1$ is preferably 0.0504 (m) or more, and when $L_P$ is 20 m, $L_1$ is preferably 1.00 m or more.

Namely, when $\gamma_r TRF_2$ is assumed to be 10 turns/m, a value of $L_1$ of 1 m or more when $L_P$ is 20 m makes it possible to provide the twist in which $\gamma_w$ is 3 turns/m or more at which an adequate effect for reducing polarization mode dispersion is obtained.

A desired amount for the length $L_1$ of the upstream free path line can be obtained in the manner described above. However, there are cases in which a required amount of upstream free path line length $L_1$ cannot be secured due to restrictions imposed by equipment structure. Therefore, in the present embodiment, as shown in FIG. 3, a required amount of the upstream free path line length $L_1$ can be secured by providing the twist non-inhibiting roller 12 between the upstream twist inhibiting roller 11 and the twist provider 13 or by bending the upstream free path line as necessary with the twist non-inhibiting roller 12.

Figure 15:
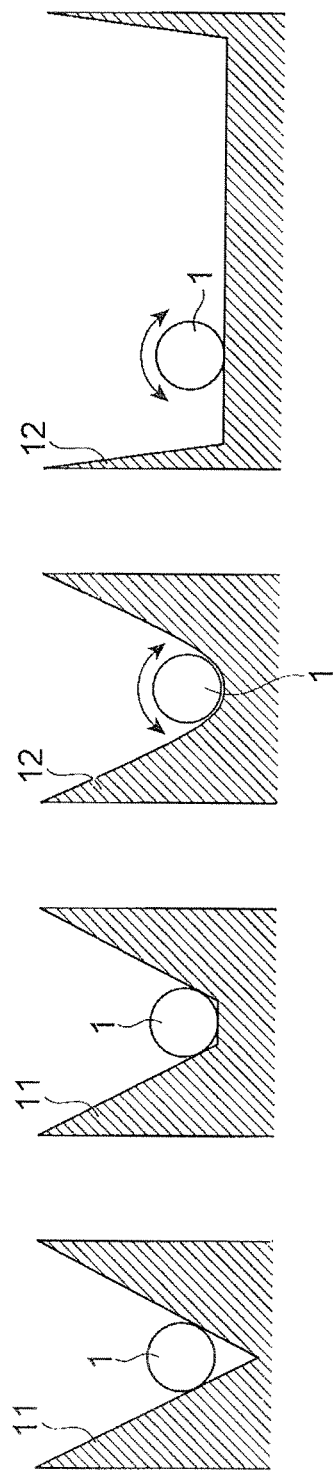
FIGS. 15A to 15D are drawings showing the cross-sectional shape of a guide groove in a roller.

The twist non-inhibiting roller 12 preferably has a guide groove having a cross-sectional shape as shown in FIGS. 15C and 15D. Furthermore, FIGS. 15A to 15D of cross-sectional views showing the shapes of grooves in a roller. Namely, during the time the coated optical fiber 1 is rotating as a result of being provided with the twist, the twist non-inhibiting roller 12 has a groove of a size or shape such that the coated optical fiber 1 makes contact at a single point in the groove in order make it difficult for the rotation thereof to be inhibited. In FIGS. 15A to 15D, a roller having a V-shaped groove whose cross-section is formed into a V shape as shown in FIG. 15A or a roller having a groove combining a V-shaped groove and a flat bottom groove as shown in FIG. 15B (hereinafter referred to as flat bottom V-shaped groove) is used as the upstream twist inhibiting roller 11 or the downstream twist inhibiting roller 14 that inhibits rotation by the coated optical fiber 1 around the axis of the coated optical fiber 1. Since the rotation of the coated optical fiber 1 is easily inhibited during the time the coated optical fiber 1 itself is rotating as a result of being provided with the twist, the twist inhibiting roller 14 has a groove of a size or shape such that the coated optical fiber 1 makes contact with the groove at at least 2 points. On the other hand, a U-shaped groove roller in which the cross-section thereof is formed into a U shape as shown in FIG. 15C or a roller having a flat bottom in which the cross-section thereof is formed to have a wide, flat bottom as shown in FIG. 15D can be used as the twist non-inhibiting roller 12 that does not inhibit rotation by the coated optical fiber 1 around the axis of the coated optical fiber 1.

As a result of bending the path line of the coated optical fiber 1 within a confined space in which the twist non-inhibiting roller 12 is provided in this manner, the upstream free path line from the upstream twist inhibiting roller 11 to the twist provider 13 is substantially extended. As a result thereof, a required amount of upstream free path line length $L_1$ can be secured, and the twist amplitude $\gamma_w$ able to be provided to the coated optical fiber 1 can be increased.

Figure 16:
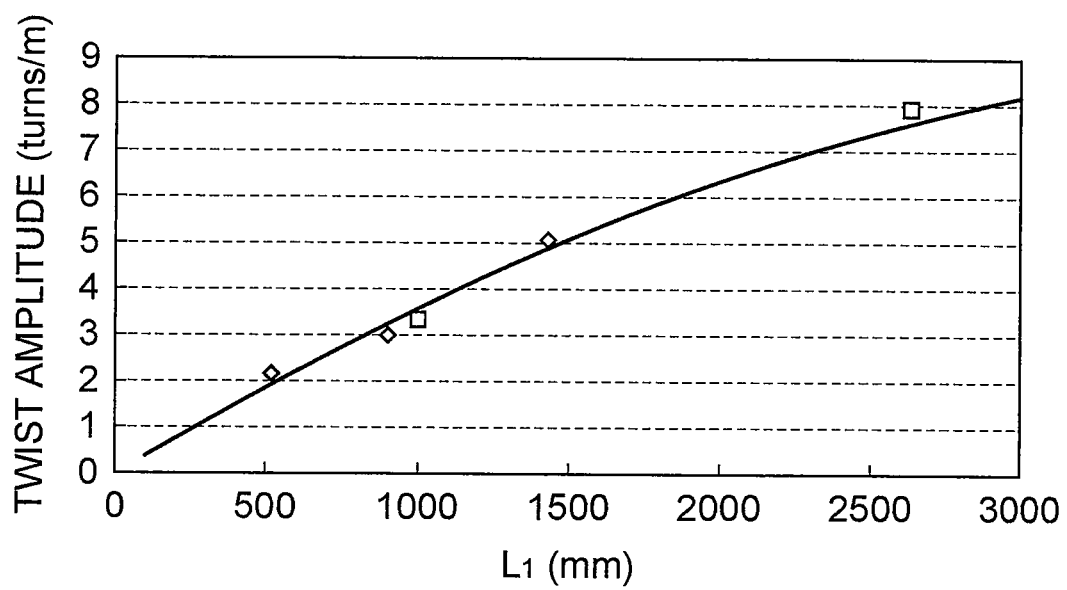
FIG. 16 is a graph indicating the relationship between upstream free path line length $L_1$ and twist amplitude $\gamma_w$.

FIG. 16 is a graph indicating the relationship between upstream free path line length $L_1$ and twist amplitude $\gamma_w$. Here, $\gamma_r$ is 12.5 turns/m, $L_P$ is 20 m and $L_2$ is 1 m. In the graph, diamonds (◆) indicate the results of conducting the experiment using a roller having a flat bottom V-shaped groove (FIG. 15B) for the upstream twist inhibiting roller 11 but not providing the twist non-inhibiting roller 12. Squares (□) indicate the results of conducting the experiment using a roller having a flat bottom groove (FIG. 15D) having a width of 50 mm for the twist non-inhibiting roller 12 and using a roller having a flat bottom V-shaped groove (FIG. 15B) for the upstream twist inhibiting roller 11. In addition, the solid line indicates the relationship between length $L_1$ and twist amplitude $\gamma_w$ as determined in the above-mentioned formula (18).

Among the two experimental results indicated with squares (□), one indicates the results in the case the path line length from the twist non-inhibiting roller 12 to the twist provider 13 is 520 mm, and the upstream free path line length $L_1$ from the upstream twist inhibiting roller 11 to the twist provider 13 is 1000 mm. The other indicates the results in the case the path line length from the twist non-inhibiting roller 12 to the twist provider 13 is 1400 mm and the upstream free path line length $L_1$ from the upstream twist inhibiting roller 11 to the twist provider 13 is 2600 mm.

FIG. 16 indicates that the value of the twist amplitude $\gamma_w$ is larger the longer the length $L_1$ of the upstream free path line, and that the length $L_1$ of the upstream free path line can be increased to at least 2600 mm by providing the twist non-inhibiting roller 12.

The invention claimed is:

1. A coated optical fiber producing apparatus of producing a coated optical fiber having a glass optical fiber, which is constituted by a glass core region and a glass cladding region provided on an outer periphery of the core region, and a resin layer coated on a surface of the glass optical fiber, the coated optical fiber being wound onto a bobbin in a state of being provided with a twist, the apparatus comprising:
   a twist provider providing the twist to the coated optical fiber;
   an upstream twist inhibiting roller, arranged upstream of the twist provider with respect to a traveling direction of the coated optical fiber, inhibiting a rotation of the coated optical fiber around the axis of the coated optical fiber with no twist;
   a twist non-inhibiting roller, arranged between the upstream twist inhibiting roller and the twist provider, not inhibiting the rotation of the coated optical fiber around the axis of the coated optical fiber, the twist non-inhibiting roller adjusting a length of a path line between the upstream twist inhibiting unit and the twist provider by maintaining the path line of the coated optical fiber between the upstream twist inhibiting roller and the twist provider in a bent state; and
   a winder winding the coated optical fiber, to which the twist has been provided, onto the bobbin.

2. A coated optical fiber producing apparatus of producing a coated optical fiber having a glass optical fiber, which is constituted by a glass core region and a glass cladding region provided on an outer periphery of the core region, and a resin layer coated on a surface of the glass optical fiber, the coated optical fiber being wound onto a bobbin in a state of being provided with a twist, the apparatus comprising:
   a feeder feeding the coated optical fiber with no twist, and functioning as an upstream twist which inhibiting unit which inhibits a rotation of the coated optical fiber, the rotation of the coated optical fiber being induced by the twist generated downstream;
   a winder winding the coated optical fiber, to which the twist has been provided, onto the bobbin;
   a twist provider providing the twist to the coated optical fiber; and
   a twist non-inhibiting roller, arranged between the feeder and the twist provider, not inhibiting the rotation of the coated optical fiber around the axis of the coated optical fiber, the twist non-inhibiting roller maintaining a path line of the coated optical fiber between the upstream twist inhibiting roller and the twist provider in a bent state.

3. A producing apparatus according to claim 1, wherein the twist non-inhibiting roller has, as a guide groove for the coated optical fiber, a U-shaped groove whose cross-section is formed into a U shape, or a flat bottom groove whose bottom is formed to have a wide width, the U-shaped groove or the flat bottom groove having a sufficient groove width to a degree that does not inhibit a twist-induced rotation of the coated optical fiber.

4. A coated optical fiber producing method of producing a coated optical fiber having a glass optical fiber, which is constituted by a glass core region and a glass cladding region provided on an outer periphery of the core region, and a resin layer coated on a surface of the glass optical fiber, the coated optical fiber being wound onto a bobbin in a state of being provided with a twist, the producing method comprising the steps of:

arranging a twist provider which provides the twist to the coated optical fiber on a path line of the coated optical fiber;

arranging an upstream twist inhibiting roller which inhibits a rotation of the coated optical fiber around the axis of the coated optical fiber upstream of the twist provider, with respect to a traveling direction of the coated optical fiber;

arranging a twist non-inhibiting roller which does not inhibit the rotation of the coated optical fiber around the axis of the coated optical fiber, on the path line of the coated optical fiber located between the upstream twist inhibiting roller and the twist provider;

supplying the coated optical fiber with no twist;

setting the arrangement location of the twist non-inhibiting roller so that the path line of the coated optical fiber located between the upstream twist inhibiting roller and the twist provider is bent;

providing the twist to the coated optical fiber by passing the coated optical fiber over the upstream twist inhibiting roller, the twist non-inhibiting roller and the twist provider in this order; and winding the coated optical fiber, to which the twist has been provided, onto the bobbin.

5. A coated optical fiber producing method of producing a coated optical fiber having a glass optical fiber, which is constituted by a glass core region and a glass cladding region provided on an outer periphery of the core region and a resin layer coated on a surface of the glass optical fiber, the a coated optical fiber being wound onto a bobbin in a state of being provided with a twist, the producing method comprising the steps of:

arranging a twist provider which provides the twist to the coated optical fiber on a path line of the coated optical fiber;

arranging, upstream of the twist provider with respect to a traveling direction of the coated optical fiber, a feeder which supplies the coated optical fiber with no twist and which inhibits a rotation of the coated optical fiber the rotation of the coated optical fiber being induced by the twist generated downstream;

arranging a twist non-inhibiting roller which does not inhibit the rotation of the coated optical fiber, on the path line of the coated optical fiber located between the feeder and the twist provider;

providing the twist to the coated optical fiber by passing the coated optical fiber over the feeder, the twist non-inhibiting roller and the twist provider in this order; and winding the coated optical fiber, to which the twist has been provided, onto the bobbin.

6. A producing method according to claim 4, wherein the twist non-inhibiting roller has, as a guide groove for the coated optical fiber, a U-shaped groove whose cross-section is formed into a U shape, or a flat bottom groove whose bottom is formed to have a wide width, the U-shaped groove or the flat bottom groove having a sufficient groove width to a degree that does not inhibit a twist-induced rotation of the coated optical fiber.

7. A producing method according to claim 4, wherein a downstream twist inhibiting roller, which inhibits the rotation of the coated optical fiber around the axis of the coated optical fiber, is arranged upstream of the twist provider with respect to the traveling direction of the coated optical fiber, and wherein the upstream twist inhibiting roller and the twist provider are arranged such that when a twist period is defined as $L_P$, a twist amplitude of the twist provider is defined as $\gamma_r$, a twist amplitude $\gamma_w$ of the downstream twist inhibiting roller is assumed to be 1 turn/m or more, and a length of the path line of the coated optical fiber from the twist provider to the downstream twist inhibiting roller is defined as $L_2$, then a length $L_1$ of the path line of the coated optical fiber from the upstream twist inhibiting roller to the twist provider satisfies the relationship set forth in the following formulas (1a) and (1b):

$$L_1 = \frac{L_p}{2\pi\sqrt{(\gamma_r TRF_2)^2 - 1}} \tag{1a}$$

$$TRF_2 = \frac{1}{\sqrt{(2\pi L_2/L_p)^2 + 1}}. \tag{1b}$$

8. A producing method according to claim 5, wherein a downstream twist inhibiting roller, which inhibits the rotation of the coated optical fiber around the axis of the coated optical fiber, is arranged downstream of the twist provider with respect to the traveling direction of the coated optical fiber, and wherein the feeder and the twist provider are arranged such that when a twist period is defined as $L_P$, a twist amplitude of the twist provider is defined as $\gamma_r$, a twist amplitude $\gamma_w$ of the downstream twist inhibiting roller is assumed to be 1 turn/m or more, and a length of the path line of the coated optical fiber from the twist provider to the downstream twist inhibiting roller is defined as $L_2$, then a length $L_1$ of the path line of the coated optical fiber from the supply bobbin to the twist provider satisfies the relationship set forth in the following formulas (2a) and (2b):

$$L_1 = \frac{L_p}{2\pi\sqrt{(\gamma_r TRF_2)^2 - 1}} \tag{2a}$$

$$TRF_2 = \frac{1}{\sqrt{(2\pi L_2/L_p)^2 + 1}}. \tag{2b}$$

9. A coated optical fiber producing method of producing a coated optical fiber having a glass optical fiber, which is constituted by a glass core region and a glass cladding region provided on an outer periphery of the core region, and a resin layer coated on a surface of the glass optical fiber, the coated optical fiber being wound onto a bobbin in a state of being provided with a twist, the producing method comprising the steps of:

arranging a twist provider which provides the twist to the coated optical fiber, on the path line of the coated optical fiber;

arranging an upstream roller upstream of the twist provider, with respect to a traveling direction of the coated optical fiber;

supplying the coated optical fiber with no twist;

setting a positional relationship of the upstream roller and the twist provider such that when a twist period is defined as $L_P$ and a twist amplitude of the twist provider is defined as $\gamma_r$, a length $L_1$ of the pass line of the coated optical fiber from the upstream roller to the twist provider satisfies the relationship set forth in the following formula (3);

providing the twist to the coated optical fiber by passing the coated optical fiber over the upstream roller and the twist provider in this order; and winding the coated optical fiber, to which the twist has been provided, onto the bobbin:

$$L_1 \geq \frac{L_p}{2\pi\sqrt{\gamma_r^2 - 1}}. \qquad (3)$$

10. A coated optical fiber producing method of producing a coated optical fiber having a glass optical fiber, which is constituted by a glass core region and a glass cladding region provided on an outer periphery of the core region, and a resin layer coated on a surface of the glass optical fiber, the coated optical fiber being wound onto a bobbin in a state of being provided with a twist, the producing method comprising the steps of:

arranging a twist provider which provides the twist to the coated optical fiber, on a path line of the coated optical fiber;

arranging, upstream of the twist provider with respect to a traveling direction of the coated optical fiber, a feeder which supplies the coated optical fiber with no twist and which inhibits a rotation of the coated optical fiber, the rotation of the coated optical fiber being induced by the twist generated downstream;

setting a positional relationship of the feeder and the twist provider such that when a twist period is defined as $L_P$ and a twist amplitude of the twist provider is defined as $\gamma_r$, a length $L_1$ of the path line of the coated optical fiber from the feeder to the twist provider satisfies the relationship set forth in the following formula (4);

providing the twist to the coated optical fiber by passing the coated optical fiber over the feeder and the twist provider in this order; and winding the coated optical fiber, to which the twist has been provided, onto the bobbin:

$$L_1 \geq \frac{L_p}{2\pi\sqrt{\gamma_r^2 - 1}}. \qquad (4)$$

11. A coated optical fiber producing method of producing a coated optical fiber having a glass optical fiber, which is constituted by a glass core region and a glass cladding region provided on an outer periphery of the core region, and a resin layer coated on a surface of the glass optical fiber, the coated optical fiber being wound onto a bobbin in a state of being providing with a twist, the producing method comprising the steps of:

arranging a twist provider which provides the twist to the coated optical fiber, on the path line of the coated optical fiber;

arranging an upstream roller upstream of the twist provider, with respect to a traveling direction of the coated optical fiber;

supplying the coated optical fiber with no twist;

setting a positional relationship of the upstream roller and the twist provider such that a twist period is assumed to be 20 m and a product ($\gamma_r \text{TRF}_2$) of a twist amplitude $\gamma_r$ of the twist provider and a twist release factor $\text{TRF}_2$ after the twist provider is assumed to be 10 turns/m, a length $L_1$ of a path line of the coated optical fiber from the upstream roller to the twist provider is 1 m or more;

providing the twist to the coated optical fiber by passing the coated optical fiber over the upstream roller and the twist provider in this order; and winding the coated optical fiber, to which the twist has been provided, onto the bobbin.

12. A coated optical fiber producing method of producing a coated optical fiber having a glass optical fiber, which is constituted by a glass core region and a glass cladding region provided on an outer periphery of the core region, and a resin layer coated on a surface of the glass optical fiber, the coated optical fiber being wound onto a bobbin in a state of being provided with a twist, the producing method comprising the steps of:

arranging a twist provider which provides the twist to the coated optical fiber, on a path line of the coated optical fiber;

arranging, upstream of the twist provider with respect to a traveling direction of the coated optical fiber, a feeder which supplies the coated optical fiber with no twist and which inhibits a rotation of the coated optical fiber, the rotation of the coated optical fiber being induced by the twist generated downstream;

setting a positional relationship of the feeder and the twist provider such that a twist period is assumed to be 20 m and a product ($\gamma_r \text{TRF}_2$) of a twist amplitude $\gamma_r$ of the twist provider and a twist release factor $\text{TRF}_2$ after the twist provider is assumed to be 10 turns/m, a length $L_1$ of a path line of the coated optical fiber from the feeder to the twist provider is 1 m or more;

providing the twist to the coated optical fiber by passing the coated optical fiber over the feeder and the twist provider in this order; and winding the coated optical fiber, to which the twist has been provided, onto the bobbin.

13. A producing apparatus according to claim 2, wherein the twist non-inhibiting roller has, as a guide groove for the coated optical fiber, a U-shaped groove whose cross-section is formed into a U shape, or a flat bottom groove whose bottom is formed to have a wide width, the U-shaped groove or the flat bottom groove having a sufficient groove width to a degree that does not inhibit a twist-induced rotation of the coated optical fiber.

14. A producing method according to claim 5, wherein the twist non-inhibiting roller has, as a guide groove for the coated optical fiber, a U-shaped groove whose cross-section is formed into a U shape, or a flat bottom groove whose bottom is formed to have a wide width, the U-shaped groove or the flat bottom groove having a sufficient groove width to a degree that does not inhibit a twist-induced rotation of the coated optical fiber.

* * * * *